United States Patent
Utsunomiya et al.

(10) Patent No.: US 10,355,588 B2
(45) Date of Patent: Jul. 16, 2019

(54) POWER SOURCE DEVICE INCLUDING VOLTAGE BOOST CIRCUIT

(71) Applicants: ABLIC INC., Chiba-shi, Chiba (JP); The Ritsumeikan Trust, Kyoto-shi, Kyoto (JP)

(72) Inventors: Fumiyasu Utsunomiya, Chiba (JP); Takakuni Douseki, Kusatsu (JP); Ami Tanaka, Kusatsu (JP)

(73) Assignees: ABLIC INC., Chiba (JP); THE RITSUMEIKAN TRUST, Kyoto (JP)

( * ) Notice: Subject to any disclaimer, the term of this patent is extended or adjusted under 35 U.S.C. 154(b) by 0 days.

(21) Appl. No.: 16/006,379

(22) Filed: Jun. 12, 2018

(65) Prior Publication Data
US 2018/0367034 A1    Dec. 20, 2018

(30) Foreign Application Priority Data
Jun. 16, 2017  (JP) .................. 2017-118943

(51) Int. Cl.
*G06F 1/20* (2006.01)
*H02M 3/155* (2006.01)
(Continued)

(52) U.S. Cl.
CPC .......... *H02M 3/155* (2013.01); *H02J 1/00* (2013.01); *H02M 3/156* (2013.01); *G05F 1/575* (2013.01); *H02M 1/08* (2013.01)

(58) Field of Classification Search
CPC ....... G05F 1/575; H02M 3/155; H02M 3/156; H02M 3/1563; H02M 3/157; H02M 3/158;
(Continued)

(56) References Cited

U.S. PATENT DOCUMENTS

| | | | |
|---|---|---|---|
| 6,163,141 A * | 12/2000 | Yoshida | H02J 7/0065 323/266 |
| 7,652,454 B2 * | 1/2010 | Utsunomiya | H02M 3/1588 307/151 |

(Continued)

FOREIGN PATENT DOCUMENTS

| | | |
|---|---|---|
| EP | 2913913 A1 | 9/2015 |
| JP | 2005-137071 A | 5/2005 |

(Continued)

OTHER PUBLICATIONS

Extended European Search Report for Europe Application No. 18177580.0, dated Nov. 7, 2018, pp. 1-9.

*Primary Examiner* — Fred E Finch, III
*Assistant Examiner* — Nusrat Quddus
(74) *Attorney, Agent, or Firm* — Brinks Gilson & Lione

(57) ABSTRACT

A power source device includes a storage capacitor, a voltage detection circuit, input terminals, and output terminals, further includes: a boost circuit which converts a storage power provided to the input terminals to a boosted power under the condition that a stored voltage becomes equal to or greater than the predetermined voltage, and outputs the boosted power from the output terminals; and a MOS transistor which controls a supply of the boosted power to a load. One of the input terminals is connected to a gate terminal of the MOS transistor, and one of the output terminals is connected to a source terminal of the MOS transistor. The MOS transistor turns on to convert the storage power to the boosted power in the boost circuit, while the MOS transistor turns off not to convert the storage power to the boosted power in the boost circuit.

3 Claims, 4 Drawing Sheets

(51) Int. Cl.
*H02M 3/156* (2006.01)
*H02J 1/00* (2006.01)
*G05F 1/575* (2006.01)
*H02M 1/08* (2006.01)

(58) Field of Classification Search
CPC . H02M 3/1582; H02M 3/1584; H02M 3/1588
USPC .......................................... 323/271–289, 315
See application file for complete search history.

(56) References Cited

U.S. PATENT DOCUMENTS

| | | | |
|---|---|---|---|
| 7,944,778 B2* | 5/2011 | Nakamiya | G04C 10/00 |
| | | | 318/696 |
| 10,075,068 B2* | 9/2018 | Utsunomiya | H02M 1/08 |
| 2005/0265052 A1* | 12/2005 | Utsunomiya | H02M 3/073 |
| | | | 363/60 |
| 2006/0068242 A1 | 3/2006 | Norimatsu et al. | |
| 2006/0222916 A1 | 10/2006 | Norimatsu et al. | |
| 2006/0256591 A1* | 11/2006 | Utsunomiya | H02M 3/07 |
| | | | 363/59 |
| 2015/0256062 A1 | 9/2015 | Shirahata et al. | |

FOREIGN PATENT DOCUMENTS

| WO | WO 2014/064762 A1 | 5/2014 |
|---|---|---|
| WO | WO 2017/007619 A1 | 1/2017 |

* cited by examiner

POWER SOURCE DEVICE INCLUDING VOLTAGE BOOST CIRCUIT

RELATED APPLICATIONS

This application claims priority under 35 U.S.C. § 119 to Japanese Patent Application No. 2017-118943 filed on Jun. 16, 2017, the entire content of which is hereby incorporated by reference.

BACKGROUND OF THE INVENTION

Field of the Invention

The present invention relates to a power source device.

Description of Related Art

Conventionally, power source control devices such as shown in WO2014/064762 are known.

In the power source control device disclosed in WO2014/064762, electric power generated at a power source is charged in a storage element. A DC-DC convertor converts the power input from an input power feeding line to a prescribed voltage and supplies it to a load connected to an output power feeding line. Exceedance of an input voltage to the first prescribed voltage activates the DC-DC convertor to start power feeding. A power source control unit is connected to the output power feeding line and operates upon receiving power therefrom. The power source control unit controls the power supply to the load while changing operation modes in accordance with the power source energy from the power source. The power source control unit is configured from a microcomputer. The power source control unit is activated upon receiving power supplied from the DC-DC converter, and then operates in a low power-consumption operation mode in which only periodic monitoring of the detected power source energy is performed. The power control unit monitors the power source energy, and starts supplying of power to the load under the condition that the power source energy exceeds the level equivalent to a state where voltage at the input power feeding line reaches the second prescribed voltage higher than the first prescribed voltage.

FIG. 4 is a schematic circuit diagram showing a conventional power source device P1. The conventional power source device P1 includes a storage capacitor P101, a voltage detection circuit P102, a boost circuit P301, a control circuit P302, a switching element P303, input terminals P131, P132, and output terminals P133, P134.

An output terminal P120 of a power generator P100 is connected to one terminal of the storage capacitor P101 via the input terminal P131. An output terminal P120-2 of the power generator P100 is connected to a ground terminal P110 via the input terminal P132. The other terminal of the storage capacitor P101 is connected to a ground terminal P110. One terminal of the storage capacitor P101 is connected to an input terminal P121 of the voltage detection circuit P102, an input terminal P320 of the boost circuit P301, and an input terminal P323 of the control circuit P302.

An output terminal P122 of the voltage detection circuit P102 is connected to an enable terminal P321 of the boost circuit P301. An output terminal P322 of the boost circuit P301 is connected to one terminal of the switching element P303, and a power source terminal P324 of the control circuit P302.

The other terminal of the switching element P303 is connected to an input terminal P127 of the load P105 via the output terminal P133. An input terminal P127-2 of the load P105 is connected to a ground terminal P110 via the output terminal P134. The switching element P303 is controlled by a signal output from the output terminal P325 of the control circuit P302. In the boost circuit P301, the input terminal P320 and the output terminal P322 of the boost circuit P301 are connected via a rectifier such as a Schottky diode.

In the conventional power source device P1 shown in FIG. 4, power generated by the power generator P100 from sunlight, temperature difference, vibration, etc., is charged to the storage capacitor P101. According to detection of the voltage detection circuit P102 that the stored voltage is equal to or greater than the prescribed voltage, the boost circuit P301 converts the storage power to the boosted power.

The switching element P303 controls the boosted power supplied to the load P105. A driving power for the control circuit P302 is supplied from the output terminal P322 of the boost circuit P301. When the stored voltage monitored at the input terminal P323 is equal to or more than the prescribed voltage, the control circuit P302 turns the switching element P303 on.

In the conventional power source device P1 shown in FIG. 4, the control circuit P302 consumes power from the power generator P100. Further, the voltage of the signal (output voltage) supplied from the output terminal P325 to the switching element P303 becomes unstable at the voltage of the power supplied to the power source terminal P324 of the control circuit P302 which is lower than the minimum operation voltage of the control circuit P302. Hence, the switching element P303 becomes weak-on state, and the load 105 also consumes the power from the power generator P100. Accordingly, in a case where the power generated by the power generator P100 is extremely low, the storage power is consumed by the control circuit P302 and the load P105 after the stored voltage rises to a certain level. Then, the stored voltage stops rising.

An object of the present invention is to provide a power source device capable of suppressing power consumption by a load at a low stored voltage without employing a power-consuming control circuit.

SUMMARY OF THE INVENTION

In order to achieve the above-object, the present invention adopts the following aspects.

One aspect of the present invention is a power source device which receives an electric power from a power generator and supplies the electric power to a load. The power source device includes: a storage capacitor configured to store the electric power provided from the power generator; a voltage detection circuit configured to detect a stored voltage of the storage capacitor; a boost circuit configured to boost a storage power of the storage capacitor by activation from the voltage detection circuit, and configured to output a boosted power; a p-channel MOS transistor connected between an output of the boost circuit and the load. One terminal of the storage capacitor is connected to the power generator and an input terminal of the boost circuit, while the other terminal is connected to a ground terminal. A gate terminal of the p-channel MOS transistor is connected to the one terminal of the storage capacitor, a source terminal of the p-channel MOS transistor is connected to an output terminal of the boost circuit, and a drain terminal of the p-channel MOS transistor is connected to the load.

According to the above-described aspect, it is possible to provide a power source device capable of suppressing power consumption by the load at a low stored voltage without employing a power-consuming control circuit.

DETAILED DESCRIPTION OF THE INVENTION

<First Embodiment>

Hereinafter, embodiments of a power source device 1 will be described with reference to the drawings.

Figure 1:
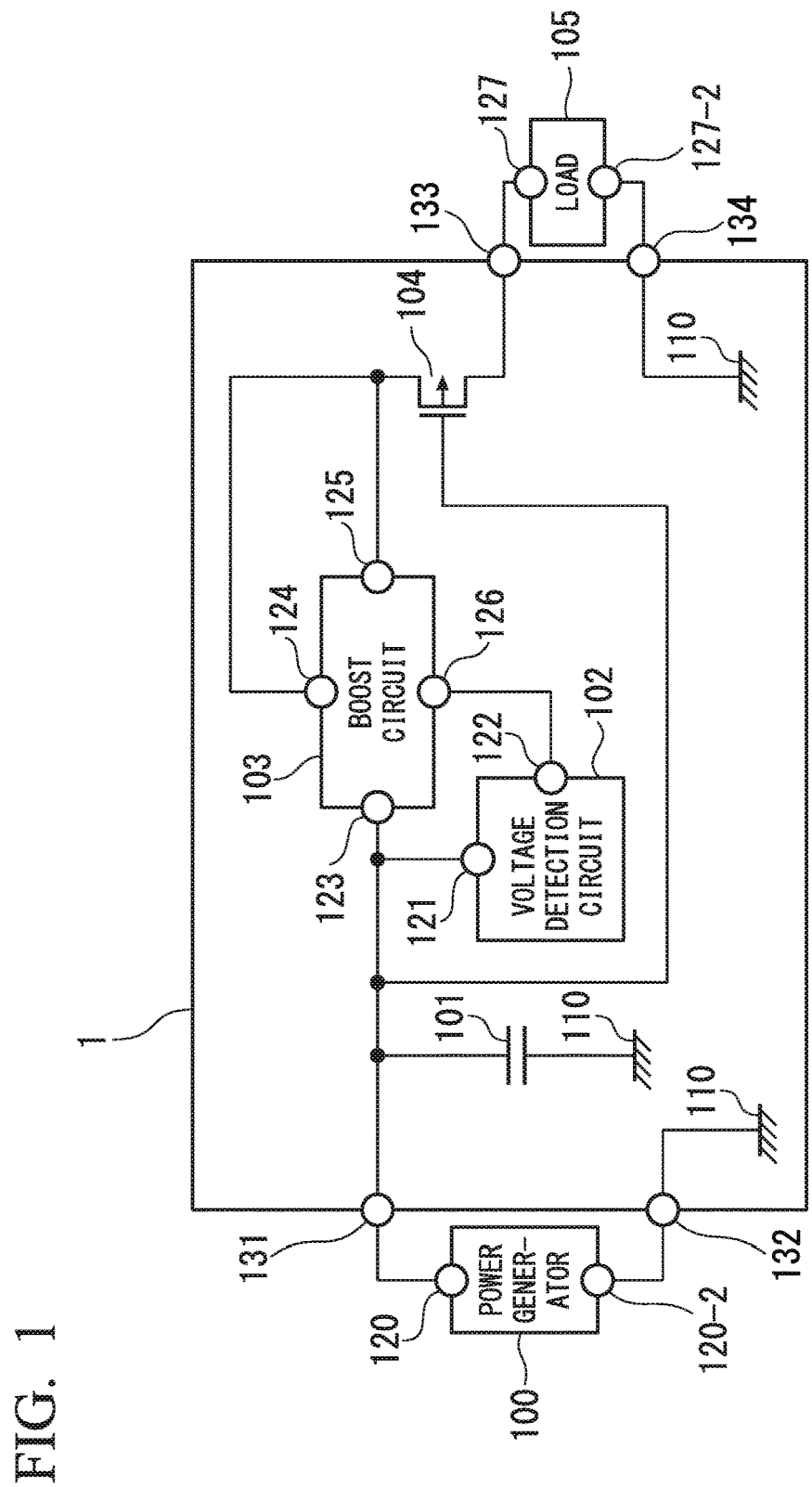
FIG. 1 is a schematic circuit diagram of a power source device according to a first embodiment.

FIG. 1 is a schematic circuit diagram of a power source device 1 according to the first embodiment.

In the example of FIG. 1, the power source device 1 includes a storage capacitor 101, a voltage detection circuit 102, a boost circuit 103, a p-channel MOS transistor 104, input terminals 131, 132, and output terminals 133, 134. The voltage detection circuit 102 includes an input terminal 121 and an output terminal 122. The boost circuit 103 includes an input terminal 123, a power source terminal 124, an output terminal 125, and an enable terminal 126.

The input terminal 131 is connected to one terminal of the storage capacitor 101, the input terminal 121 of the voltage detection circuit 102, the input terminal 123 of the boost circuit 103, and a gate terminal of a p-channel MOS transistor 104. The other terminal of the storage capacitor 101 is connected to a ground terminal 110. The input terminal 132 is connected to a ground terminal 110. The output terminal 122 of the voltage detection circuit 102 is connected to the enable terminal 126 of the boost circuit 103. The input terminal 123 and the output terminal 125 of the boost circuit 103 are connected to each other in the boost circuit 103 via a rectifier such as a Schottky diode. The output terminal 125 of the boost circuit 103 is connected to the power source terminal 124 of the boost circuit 103 and a source terminal of the p-channel MOS transistor 104. A drain terminal of the p-channel MOS transistor 104 is connected to the output terminal 133. The output terminal 134 is connected to a ground terminal 110. Some of the above circuit elements are connected to the ground terminals 110; however, explanation for the connection with the ground terminal 110 is omitted here.

A power generator 100 and a load 105 are provided outside the power source device 1. An output terminal 120 of the power generator 100 is connected to the input terminal 131. An output terminal 120-2 of the power generator 100 is connected to the input terminal 132. An input terminal 127 of the load 105 is connected to the output terminal 133. An input terminal 127-2 of the load 105 is connected to the output terminal 134.

In the example shown in FIG. 1, the power generator 100 generates electric power from energy such as sunlight, temperature difference, vibration, etc. The storage capacitor 101 stores electric power generated by the power generator 100 as a storage power. The stored voltage between terminals of the storage capacitor 101 rises in accordance with the increasing storage power charged therein. The voltage detection circuit 102 measures the stored voltage in the storage capacitor 101.

According to detection by the voltage detection circuit 102 that the stored voltage becomes equal to or greater than the voltage necessary for activating the boost circuit 103, the boost circuit 103 is activated by the voltage detection circuit 102, converts the storage power input to the input terminal 123 to the boosted power, and outputs the boosted power from the output terminal 125. The p-channel MOS transistor 104 controls the supply of the boosted power to the load 105 which operates on the boosted power.

In the example shown in FIG. 1, after start of the power generation, the power generator 100 outputs generated power, and the stored voltage in the storage capacitor 101 rises. The storage power is provided to the input terminal 123 of the boost circuit 103. However, at this moment, since the stored voltage is lower than the voltage capable of activating the boost circuit 103, the boost circuit 103 doesn't convert the storage power to the boosted power.

The storage power provided to the input terminal 123 is supplied to the source terminal of the p-channel MOS transistor 104 via the rectifier (not illustrated) such as a Schottky diode in the boost circuit 103, and the output terminal 125 of the boost circuit 103. Further, the stored voltage is applied to the gate terminal of the p-channel MOS transistor 104.

In the absence of conversion of the storage power to the boosted power by the boost circuit 103, the source voltage of the p-channel MOS transistor 104 (voltage at the output terminal 125) becomes equal to or lower than the gate voltage (voltage at the input terminal 123) of the p-channel MOS transistor 104, due to the rectifier such as a Schottky diode between the input terminal 123 and the output terminal 125 of the boost circuit 103. Accordingly, the p-channel MOS transistor 104 turns off, and the storage power is not supplied to the load 105 and is not consumed by the load 105.

In the example of FIG. 1, the stored voltage further rises and the voltage detection circuit 102 detects that the stored voltage becomes equal to or greater than the prescribed voltage capable of activating the boost circuit 103, and then outputs an enable signal to the boost circuit 103. Then, the boost circuit 103 activates, converts the storage power to the boosted power, and outputs the boosted power from the output terminal 125.

The boosted power is supplied to the source terminal of the p-channel MOS transistor 104. Further, the stored voltage of the storage power which is not converted to the boosted power is applied to the gate terminal of the p-channel MOS transistor 104.

Since the voltage of the boosted power is higher than the voltage of the storage power, the source voltage of the p-channel MOS transistor 104 (voltage at the output terminal 125) becomes higher than the gate voltage (voltage at the input terminal 123) in the conversion of the storage power to the boosted power by the boost circuit 103. Then, the p-channel MOS transistor 104 turns on, and the boosted power is supplied to the load 105. The load 105 is driven by the boosted power.

A part of the boosted power output from the output terminal 125 is supplied to the power source terminal 124 of the boost circuit 103, and the boost circuit 103 continues conversion operation (boosting operation) by the boosted power boosted by itself.

In the example of FIG. 1, the storage power for conversion to the boosted power gradually decreases by activation of the boost circuit 103. Since the voltage necessary to continue the boosting operation of the boost circuit 103 is lower than voltage for activating the boost circuit 103, the boost circuit 103 continues supplying of the boosted power even though the storage power charged in the storage capacitor 101 decreases and the stored voltage lowers.

According to lowering of the stored voltage to the value which is lower than the voltage necessary for continuing the boosting operation at the boost circuit 103 so that the boost circuit 103 cannot continue the conversion operation, the conversion operation (boosting operation) stops and the p-channel MOS transistor 104 turns off, the stored voltage in the storage capacitor 101 starts rising again, and the power source device 1 repeats the above-mentioned operations.

Figure 4:
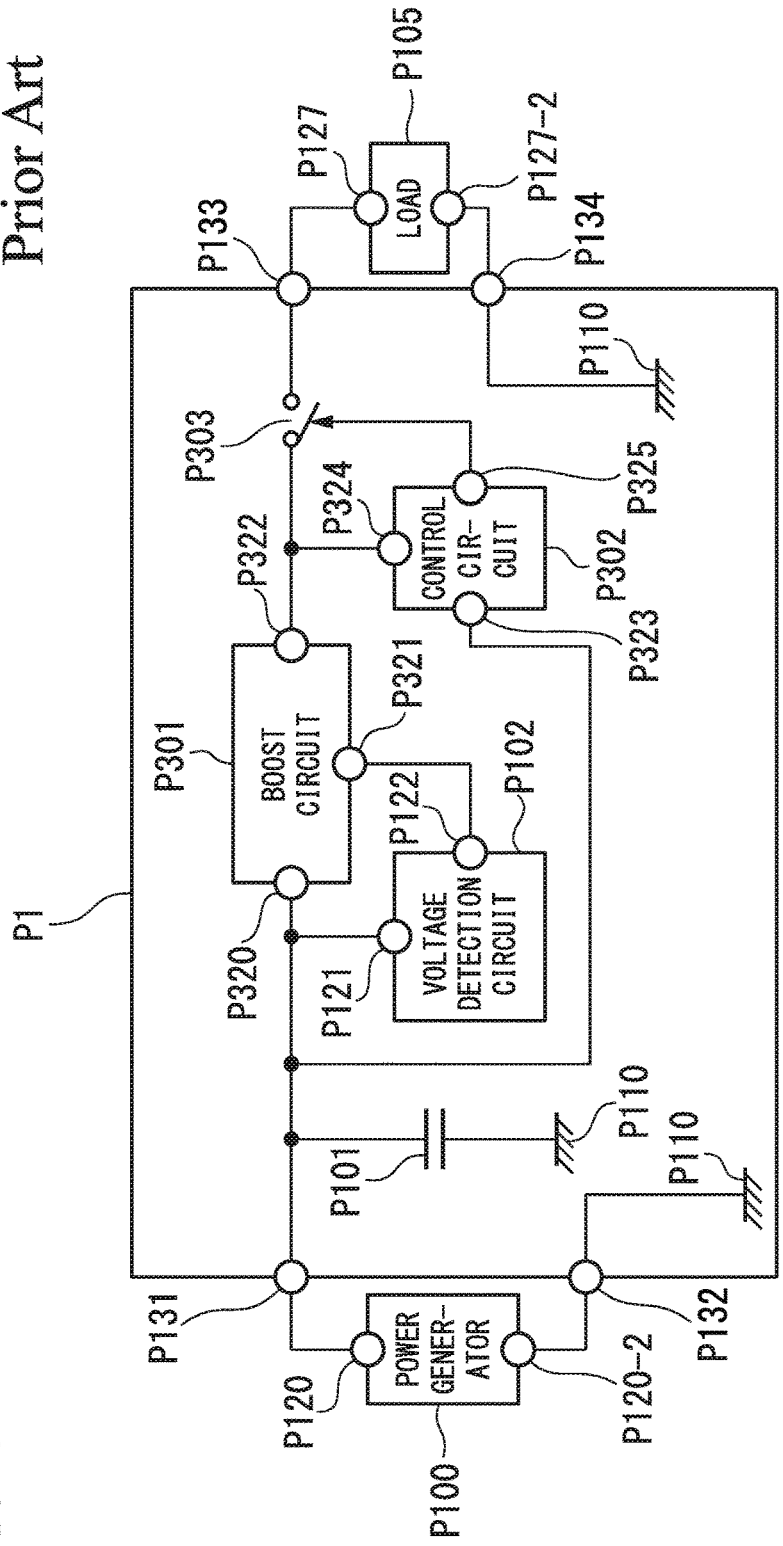
FIG. 4 is a schematic circuit diagram of a conventional power source device.

In the example shown in FIG. 1, the control circuit P302 shown in FIG. 4 is unnecessary. Further, in the example shown in FIG. 1, power consumption by the load P105 due to the weak-on state of the switching element P303 caused by the unstable output from the control circuit P302 as shown in the example of FIG. 4 can be avoided.

In the example shown in FIG. 1, since the generated power is not consumed in the load 105 despite extremely low electric power generation by the power generator 100 (the generated power is also not consumed by the control circuit), rising of the stored voltage does not stop halfway before activating the boost circuit 103. Accordingly, in the example of FIG. 1, it is possible to drive the load 105 despite the extremely low electric power generation by the power generator 100.

<Second Embodiment>

A power source device 1 of the second embodiment has the same configuration as the above-mentioned first embodiment except for the following points. According to the power source device 1 of the second embodiment, the same advantageous effects can hence be obtained as those of the power source device 1 of the first embodiment.

Figure 2:
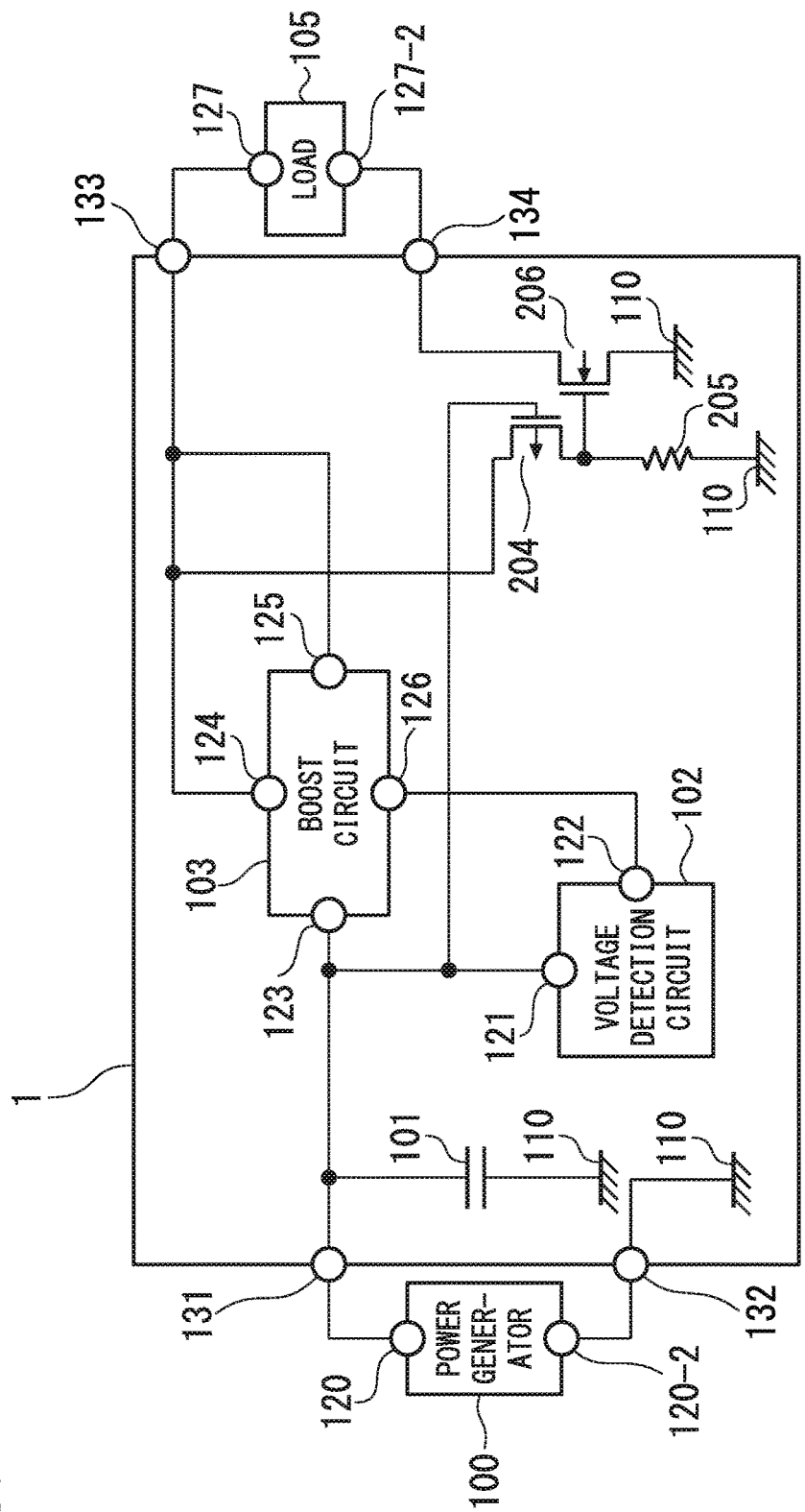
FIG. 2 is a schematic circuit diagram of a power source device according to a second embodiment.

FIG. 2 is a schematic circuit diagram of a power source device 1 according to the second embodiment.

In the example shown in FIG. 2, power source device 1 includes a p-channel MOS transistor 204 instead of the p-channel MOS transistor 104 of the first embodiment. In addition, the power source device 1 includes a pull-down resistor 205 and an n-channel MOS transistor 206 as a pull-down circuit.

Hereinafter, the same explanations as those of the first embodiment will be omitted.

The output terminal 125 of the boost circuit 103 is connected to the power source terminal 124 of the boost circuit 103, the source terminal of the p-channel MOS transistor 204, and the output terminal 133. The drain terminal of the p-channel MOS transistor 204 is connected to the gate terminal of the re-channel MOS transistor 206 and one terminal of the pull-down resistor 205. The other terminal of the pull-down resistor 205 is connected to the ground terminal 110. The drain terminal of the n-channel MOS transistor 206 is connected to the output terminal 134. The source terminal of the n-channel MOS transistor 206 is connected to the ground terminal 110. Explanation for the connection with the ground terminal 110 is omitted here as in the first embodiment.

The power generator 100 and the load 105 are provided outside the power source device 1. The output terminal 120 of the power generator 100 is connected to the input terminal 131. The output terminal 120-2 of the power generator 100 is connected to the input terminal 132. The input terminal 127 of the load 105 is connected to the output terminal 133. The input terminal 127-2 of the load 105 is connected to the output terminal 134.

The p-channel MOS transistor 204 and the n-channel MOS transistor 206 control supply of the boosted power to the load 105.

In the example of FIG. 2, after start of the power generation, the power generator 100 outputs the generated power, the stored voltage in the storage capacitor 101 rises. The storage power is provided to the input terminal 123 of the boost circuit 103. However, at this moment, since the stored voltage is still lower than the voltage capable of activating the boost circuit 103, the boost circuit 103 does not convert the storage power to the boosted power.

The storage power provided to the input terminal 123 is supplied to the source terminal of the p-channel MOS transistor 204 via the rectifier (not illustrated) such as a Schottky diode, etc., and the output terminal 125 of the boost circuit 103. In addition, the stored voltage is applied to the gate terminal of the p-channel MOS transistor 204.

In the absence of conversion of the storage power to the boosted power by the boost circuit 103, as in the first embodiment, voltage at the output terminal 125 of the boost circuit 103 becomes equal to or lower than voltage at the input terminal 123, and the source voltage of the p-channel MOS transistor 204 becomes equal to or lower than the gate voltage of the p-channel MOS transistor 204. Then, the p-channel MOS transistor 204 turns off. Accordingly, the gate voltage of the n-channel MOS transistor 206 becomes equal to the voltage of the ground terminal 110, and also becomes equal to the source voltage of the n-channel MOS transistor 206. Then, the n-channel MOS transistor 206 turns off. The storage power of the storage capacitor 101 is accordingly not consumed by the boost circuit 103 and the load 105.

In the example of FIG. 2, subsequently, the stored voltage of the storage capacitor 101 further rises, the voltage detection circuit 102 detects that the stored voltage becomes equal to or higher than the predetermined voltage capable of activating the boost circuit 103, and the voltage detection circuit 102 outputs an enable signal to the boost circuit 103. Then, the boost circuit 103 activates, converts the storage power to the boosted power, and outputs from the output terminal 125.

The boosted power is supplied to the source terminal of the p-channel MOS transistor 204. In addition, the stored voltage of the storage capacitor 101 is applied to the gate terminal of the p-channel MOS transistor 204.

Since the voltage of the boosted power is higher than the stored voltage, the source voltage (voltage at the output terminal 125) of the p-channel MOS transistor 204 is higher than the gate voltage (voltage at the input terminal 123) of the p-channel MOS transistor 204 in the conversion of the storage power to the boosted power by the boost circuit 103. Then, the p-channel MOS transistor 204 turns on. Accordingly, the gate voltage of the n-channel MOS transistor 206 becomes higher than the source voltage of the n-channel MOS transistor 206. The n-channel MOS transistor 206 thus turns on. Then, the boosted power of the boost circuit 103 is supplied to the load 105. The load 105 is driven by the boosted power from the boost circuit 103.

In addition, a part of the boosted power is supplied from the output terminal 125 to the power source terminal 124 of the boost circuit 103 so that the boost circuit 103 continues conversion operation (boosting operation) using the self-boosting boosted power.

Further, a part of the boosted power of the boost circuit 103 is supplied from the output terminal 125 to the source terminal of the p-channel MOS transistor 204, and thereby keeping the on state of the p-channel MOS transistor 204. Thus, the n-channel MOS transistor 206 also keeps its on state. Then, driving of the load 105 is continued by the boosted power from the boost circuit 103.

In the example of FIG. 2, the storage power for conversion to the boosted power gradually decreases by activation of the boost circuit 103. Since the voltage required for continuing the boosting operation of the boost circuit 103 is lower than the voltage required for activating the boost circuit 103, the boost circuit 103 continues the supply of the boosted power even though the storage power charged in the storage capacitor 101 decreases and the stored voltage becomes low.

According to lowering of the stored voltage of the storage capacitor 101 to a value lower than the voltage required for continuing the boosting operation of the boost circuit 103 so that the boost circuit 103 cannot sustain the conversion operation, the conversion operation (boosting operation) stops and the p-channel MOS transistor 204 turns off, and the n-channel MOS transistor 206 turns off. Thereafter, the stored voltage in the storage capacitor 101 starts rising again, and the power source device 1 repeats the above-described operations.

<Third Embodiment>

A power source device 1 of the third embodiment has the same configuration as that of the above-mentioned second embodiment except the following points. According to the power source device 1 of the third embodiment, the same advantageous effect can hence be obtained as those of the power source device 1 of the second embodiment.

Figure 3:
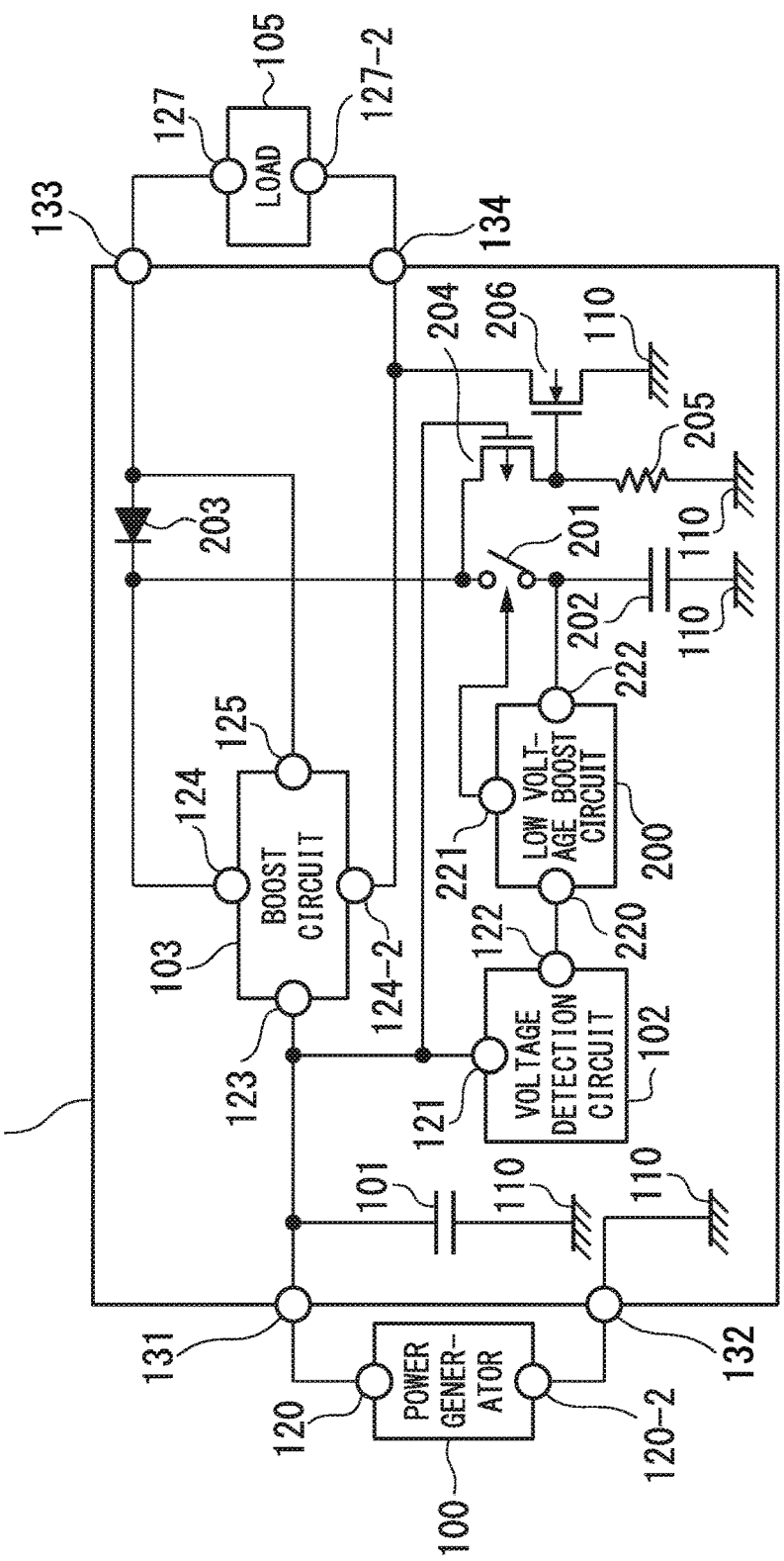
FIG. 3 is a schematic circuit diagram of a power source device according to a third embodiment.

FIG. 3 is a schematic circuit diagram of the power source device 1 according to the third embodiment.

In the example shown in FIG. 3, the power source device 1 further includes a low voltage boost circuit 200, a switching element 201, a starting capacitor 202, a Schottky diode 203 serving as a rectifier, a pull-down resistor 205, and an n-channel MOS transistor 206. The low voltage boost circuit 200 includes an input terminal 220, a control signal output terminal 221, and an output terminal 222.

While in the example of FIG. 1, the output terminal 122 of the voltage detection circuit 102 is connected to the enable terminal 126 of the boost circuit 103, in the present example of FIG. 3 the output terminal 122 of the voltage detection circuit 102 is connected to the input terminal 220 of the low voltage boost circuit 200.

Further in the example of FIG. 3, the output terminal 222 of the low voltage boost circuit 200 is connected to one terminal of the starting capacitor 202 and one terminal of the switching element 201. The other terminal of the starting capacitor 202 is connected to the ground terminal 110. The other terminal of the switching element 201 is connected to the power source terminal 124 of the boost circuit 103, a cathode terminal of the Schottky diode 203, and the source terminal of the p-channel MOS transistor 204. The switching element 201 is controlled by the signal output from the control signal output terminal 221 of the low voltage boost circuit 200.

While in the examples of FIGS. 1 and 2 the output terminal 125 and the power source terminal 124 of the boost circuit 103 are directly connected, in the example of FIG. 3 the output terminal 125 of the boost circuit 103 is connected to the anode terminal of the Schottky diode 203 and the output terminal 133. The Schottky diode 203 prevents current flowing from the starting capacitor 202 to the output terminal 125 of the boost circuit 103 and to the output terminal 133 to which the load 105 is connected.

In the example of FIG. 3, the output terminal 125 of the boost circuit 103 is connected to the source terminal of the p-channel MOS transistor 204 via the Schottky diode 203. In addition, the source terminal of the p-channel MOS transistor 204 is connected to one terminal of the starting capacitor 202 via the switching element 201. The gate terminal of the p-channel MOS transistor 204 is connected to one terminal of the storage capacitor 101. The drain terminal of the p-channel MOS transistor 204 is connected to the gate terminal of the n-channel MOS transistor 206.

The gate terminal of the n-channel MOS transistor 206 is connected to the ground terminal 110 via the pull-down resistor 205. The source terminal of the n-channel MOS transistor 206 is connected to the ground terminal 110. The drain terminal of the n-channel MOS transistor 206 is connected to the output terminal 134 to which the load 105 operated by the boosted power is connected, and the other power source terminal 124-2 of the boost circuit 103. As same as the first embodiment, explanation for the connection with the ground terminal 110 is omitted here.

The power generator 100 and the load 105 are provided outside the power source device 1. The output terminal 120 of the power generator 100 is connected to the input terminal 131. The output terminal 120-2 of the power generator 100 is connected to the input terminal 132. The input terminal 127 of the load 105 is connected to the output terminal 133. The input terminal 127-2 of the load 105 is connected to the output terminal 134.

The p-channel MOS transistor 204 and the n-channel MOS transistor 206 control supply of the boosted power to the load 105.

In the example of FIG. 3, after start of the power generation, the power generator 100 outputs the generated power, and the stored voltage in the storage capacitor 101 rises. The storage power is provided to the input terminal 123 of the boost circuit 103, and the input terminal 121 of the voltage detection circuit 102. At this moment, since the stored voltage in the storage capacitor 101 is lower than the voltage capable of activating the boost circuit 103, the boost circuit 103 does not convert the storage power to the boosted power. And the voltage detection circuit 102 does not detect that the stored voltage exceeds the voltage capable of activating the low voltage boost circuit 200.

The storage power fed from the storage capacitor 101 to the input terminal 123 is supplied to the terminal 127 of the load 105 via a rectifier (not illustrated) such as a Schottky diode in the boost circuit 103, and also via the output terminal 125 of the boost circuit 103. Further, the storage power in the storage capacitor 101 is supplied to the source terminal of the p-channel MOS transistor 204 via a rectifier such as a Schottky diode in the boost circuit 103, and also via the output terminal 125 and the rectifier such as a Schottky diode 203 of the boost circuit 103. Further, the stored voltage of the storage capacitor 101 is applied to the gate terminal of the p-channel MOS transistor 204.

In the absence of conversion of the storage power to the boosted power by the boost circuit 103, as in the first embodiment, voltage at the output terminal 125 of the boost circuit 103 becomes equal to or lower than the voltage at the input terminal 123, and thus the source voltage at the p-channel MOS transistor 204 becomes equal to or lower than the gate voltage of the p-channel MOS transistor 204. Then, the p-channel MOS transistor 204 turns off. Accordingly, the gate voltage at the n-channel MOS transistor 206 becomes equal to the voltage at the ground terminal 110, and thus becomes equal to the source voltage of the re-channel MOS transistor 206. Then, the n-channel MOS transistor 206 turns off. The boost circuit 103 and the load 105 hence do not consume the storage power in the storage capacitor 101.

In the example of FIG. 3, subsequently, the stored voltage at the storage capacitor 101 rises. Then, the voltage detection circuit 102 detects that the stored voltage at the storage capacitor 101 exceeds the voltage capable of activating the low voltage boost circuit 200, and then supplies the storage power of the storage capacitor 101 via the output terminal 122 to the input terminal 220 of the low voltage boost circuit 200. The low voltage boost circuit 200 converts the storage power of the storage capacitor 101 to the second boosted power, and then outputs the second boosted power from the output terminal 222. The second boosted power is charged in the starting capacitor 202.

In the example of FIG. 3, subsequently, the stored voltage at the starting capacitor 202 rises. After the stored voltage at the starting capacitor 202 exceeds the voltage capable of activating the boost circuit 103, the low voltage boost circuit 200 turns the switching element 201 on by the output from the control signal output terminal 221. Accordingly, the storage power in the starting capacitor 202 is supplied via the switching element 201 to the power source terminal 124 of the boost circuit 103.

Further, the storage power in the starting capacitor 202 is supplied via the switching element 201 to the source terminal of the p-channel MOS transistor 204.

At this time, the source voltage at the p-channel MOS transistor 204 becomes higher that the gate voltage at the p-channel MOS transistor 204. Then, the p-channel MOS transistor 204 turns on. The gate voltage at the n-channel MOS transistor 206 hence becomes higher than the voltage at the ground terminal 110, and exceeds the source voltage at the n-channel MOS transistor 206. Thus, the n-channel MOS transistor 206 turns on. The boost circuit 103 is then activated to convert the storage power to the boosted power and outputs the boosted power from the output terminal 125. The boosted power in the boost circuit 103 is thus supplied to the load 105. The load 105 is driven by the boosted power from the boost circuit 103.

In addition, a part of the boosted power is supplied from the output terminal 125 to the power source terminal 124 via the Schottky diode 203 so that the boost circuit 103 continues conversion operation (boosting operation) using the self-boosting boosted power.

Further, a part of the boosted power of the boost circuit 103 is supplied from the output terminal 125 to the source terminal of the p-channel MOS transistor 204 via the Schottky diode 203, and thereby keeping the on state of the p-channel MOS transistor 204. Thus, the n-channel MOS transistor 206 also keeps its on state. Then, driving of the load 105 is continued by the boosted power from the boost circuit 103.

In the example of FIG. 3, the storage power of the storage capacitor 101 for conversion to the boosted power gradually decreases by activation of the boost circuit 103. Since the voltage required for continuing the boosting operation of the boost circuit 103 is lower than the voltage required for activating the boost circuit 103, the boost circuit 103 continues the supply of the boosted power even though the storage power charged in the storage capacitor 101 decreases and the stored voltage becomes low.

According to lowering of the stored voltage to a value lower than the voltage required for continuing the boosting operation of the boost circuit 103 so that the boost circuit 103 cannot continue the conversion operation, the boost circuit 103 stops the conversion operation (boosting operation), the p-channel MOS transistor 204 turns off, the n-channel MOS transistor 206 turns off, and the switching element 201 turns off. Thereafter, the stored voltage in the storage capacitor 101 starts rising again and the power source device 1 repeats the above-described operations.

In the example of FIG. 3, the power conversion capacity of the low voltage boost circuit 200 is lower than that of the boost circuit 103, and the current consumption of the low voltage boost circuit 200 is also smaller than that of the boost circuit 103. Accordingly, even in the case where the generated power supplied from the power generator 100 is low and the storage power in the storage capacitor 101 is small, the low voltage boost circuit 200 can operate with the storage power supplied from the output terminal 122 of the voltage detection circuit 102.

On the other hand, the boost circuit 103 cannot be activated directly by the second boosted power supplied from the output terminal 222 of the low voltage boost circuit 200. Accordingly, the second boosted power is temporally charged in the starting capacitor 202. After charging of the electric power needed for activating the boost circuit 103 in the starting capacitor 202, the charged electric power is supplied to the power source terminal 124 of the boost circuit 103 via the switching element 201. Then the boost circuit 103 is activated and starts conversion operation (boosting operation), and the boost circuit 103 continues conversion operation (boosting operation) using the self-boosting boosted power.

In the example of FIG. 3, the low voltage boost circuit 200 does not consume the storage power before activating the low voltage boost circuit 200 upon detection by the voltage detection circuit 102 of the stored voltage being equal to or higher than the voltage capable of activating the low voltage boost circuit 200.

In the example of FIG. 3, the gate terminal of the n-channel MOS transistor 206 is connected via the pull-down resistor 205 to the ground terminal 110 in order to prevent the weak-on state of the n-channel MOS transistor 206 due to leakage current from the p-channel MOS transistor 204.

In the example of FIG. 3, since the low voltage boost circuit 200 is employed, the boost circuit 103 can be activated even at a lower stored voltage in the storage capacitor 101 than that of the example shown in FIG. 1.

In addition, in the example of FIG. 3, under the condition that the p-channel MOS transistor 204 is off and the n-channel MOS transistor 206 is off, the storage power in the storage capacitor 101 is not consumed by the load 105, and is also not consumed in the boost circuit 103 and the low voltage boost circuit 200.

Further, in the example of FIG. 3, the load 105 can be driven even though the electric power generated by the power generator 100 is extremely low.

In the example of FIG. 3, the Schottky diode 203 is employed as an example of the rectifier; however, thereinstead, ordinal diodes or diode-connected transistors may be employed.

Embodiments of the present invention and modifications thereof are explained in the above; however, it should be understood that these are exemplary of the invention and are not to be considered as limiting. In the above embodiments, a modified configuration having a reversed polarity may be employed by switching the polarity of the MOS transistor, and so on. These embodiments and modifications can be performed in other various ways; therefore, additions, omissions, substitutions, and other modifications can be made without departing from the scope of the invention. These embodiments and modifications are included in the scope of the invention described in the claims and equivalence thereof. Furthermore, the embodiments and the modifications can be combined with each other.

According to the present invention a power source device in which suppression of the power consumption by the load at a low stored voltage can be provided without employing a power-consuming control circuit.

What is claimed is:

1. A power source device which receives an electric power from a power generator and supplies the electric power to a load, comprising:
   input terminals connected to the power generator;
   a storage capacitor configured to store the electric power supplied from the power generator;
   a voltage detection circuit configured to detect a stored voltage of the storage capacitor;
   a boost circuit configured to boost a storage power of the storage capacitor by activation from the voltage detection circuit, and configured to output a boosted power;
   a first MOS transistor connected to an output of the boost circuit and configured to be controlled by the stored voltage; and
   output terminals connected to the load, wherein:
      one terminal of the storage capacitor is connected to one of the input terminals, an input terminal of the boost circuit, an input terminal of the voltage detection circuit, and a gate terminal of the first MOS transistor;
      another terminal of the storage capacitor is connected to a ground terminal;
      an output terminal of the voltage detection circuit is connected to an enable terminal of the boost circuit
      an output terminal of the boost circuit is connected to a power source terminal of the boost circuit and a source terminal of the first MOS transistor; and
      a drain terminal of the first MOS transistor is connected to one of the output terminals.

2. A power source device which receives an electric power from a power generator and supplies the electric power to a load, comprising:
   input terminals connected to the power generator;
   a storage capacitor configured to store the electric power supplied from the power generator;
   a voltage detection circuit configured to detect a stored voltage of the storage capacitor;
   a boost circuit configured to boost a storage power of the storage capacitor by activation from the voltage detection circuit, and configured to output a boosted power;
   a first MOS transistor connected to an output of the boost circuit and configured to be controlled by the stored voltage;
   output terminals connected to the load;
   a second MOS transistor; and
   a pull-down circuit, wherein:
      one terminal of the storage capacitor is connected to one of the input terminals, an input terminal of the boost circuit, an input terminal of the voltage detection circuit, and a gate terminal of the first MOS transistor;
      another terminal of the storage capacitor is connected to a ground terminal;
      an output terminal of the voltage detection circuit is connected to an enable terminal of the boost circuit;
      an output terminal of the boost circuit is connected to a power source terminal of the boost circuit, a source terminal of the first MOS transistor, and one of the output terminals;
      another of the output terminals is connected to a drain terminal of the second MOS transistor;
      a source terminal of the second MOS transistor is connected to the ground terminal;
      a drain terminal of the first MOS transistor is connected to a gate terminal of the second MOS transistor, and one terminal of the pull-down circuit; and
      another terminal of the pull-down circuit is connected to the ground terminal.

3. A power source device which receives an electric power from a power generator and supplies the electric power to a load, comprising:
   input terminals connected to the power generator;
   a storage capacitor configured to store the electric power supplied from the power generator;
   a voltage detection circuit configured to detect a stored voltage of the storage capacitor;
   a boost circuit configured to boost a storage power of the storage capacitor by activation from the voltage detection circuit, and configured to output a boosted power;
   a first MOS transistor connected to an output of the boost circuit and configured to be controlled by the stored voltage;
   output terminals connected to the load;
   a second MOS transistor;
   a pull-down circuit;
   a low voltage boost circuit;
   a switching element;
   a starting capacitor; and
   a rectifier, wherein:
      one terminal of the storage capacitor is connected to one of the input terminals, an input terminal of the boost circuit, an input terminal of the boost circuit, an input terminal of the voltage detection circuit, and a gate terminal of the first MOS transistor;
      another terminal of the storage capacitor is connected to a ground terminal;
      an output terminal of the boost circuit is connected to one terminal of the rectifier, and one of the output terminals;
      another terminal of the rectifier is connected to a power source terminal of the boost circuit, a source terminal of the first MOS transistor, and one terminal of the switching element;
      an output terminal of the voltage detection circuit is connected to an input terminal of the low voltage boost circuit;
      an output terminal of the low voltage boost circuit is connected to one terminal of the starting capacitor, and another terminal of the switching element;
      another terminal of the starting capacitor is connected to the ground terminal;
      a control signal output terminal of the low voltage boost circuit is connected to a control terminal of the switching element;
      another of the output terminals is connected to another power source terminal of the boost circuit, and a drain terminal of the second MOS transistor;
      a source terminal of the second MOS transistor is connected to the ground terminal;
      a drain terminal of the first MOS transistor is connected to a gate terminal of the second MOS transistor, and one terminal of the pull-down circuit; and another terminal of the pull-down circuit is connected to the ground terminal.

\* \* \* \* \*